March 12, 1935.  M. C. EDDY  1,994,126
REAR VIEW MIRROR
Filed Feb. 20, 1933
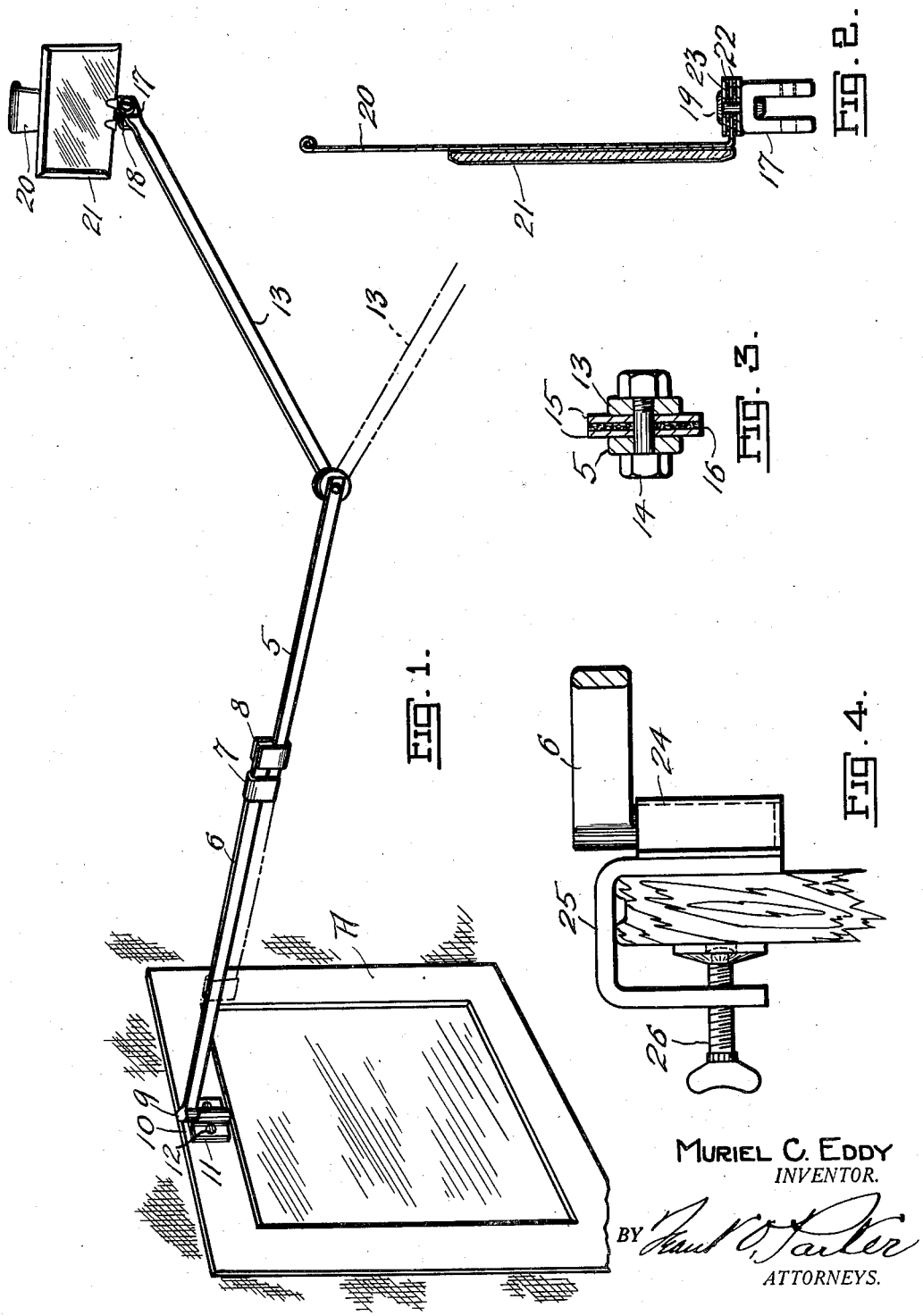
MURIEL C. EDDY
INVENTOR.
ATTORNEYS.

Patented Mar. 12, 1935

1,994,126

UNITED STATES PATENT OFFICE 1,994,126

REAR VIEW MIRROR

Muriel C. Eddy, Sheboygan, Wis.

Application February 20, 1933, Serial No. 657,695

1 Claim. (Cl. 45—97)

The invention relates to an adjustable mirror, and more especially to an adjustable rear view mirror.

The primary object of the invention is the provision of a mirror of this character, wherein the bracket for said mirror is adjustable in a vertical plane as well as swinging vertically or horizontally, thus making it possible to position the mirror in various positions at the election of the user of the same.

Another object of the invention is the provision of a mirror of this character, wherein the same is mountable upon a wall mirror or a mirror in an article of furniture and more especially to the top thereof which renders the rear view mirror more satisfactory for use, while the latter is held by a bracket which is extensible and vertically and horizontally adjustable which enables the proper positioning of said mirror in its use.

A further object of the invention is the provision of a mirror of this character, wherein the rear view mirror proper can be properly located with respect to another mirror upon a wall, stand or an article of furniture so that a user when sitting or standing with the back to the last named mirror can see the back of the head or other portion of the body.

A still further object of the invention is the provision of a mirror of this character, which is extremely simple in construction, thoroughly reliable and efficient in its purposes, readily and easily adjusted with dispatch, strong, durable, and inexpensive to manufacture.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is a fragmentary perspective view of a wall mirror showing the rear view mirror constructed in accordance with the invention applied thereto, showing in full lines one position and by dotted lines another position.

Figure 2 is an enlarged vertical sectional view showing in detail the universal joint arrangement.

Figure 3 is an enlarged sectional view through the pivotal joint.

Figure 4 is a fragmentary sectional view showing a modified form of attaching clamp.

Similar reference characters indicate corresponding parts throughout the several views in the drawing.

Referring to the drawing in detail A designates generally a standard type of wall mirror or one forming a part of an article of furniture and is shown merely to illustrate the application of the rear view mirror constituting the present invention as hereinafter fully described.

The rear view mirror comprises an extensible arm including the two superposed bars 5 and 6, respectively, each being straight and flat. The inner ends of these bars have permanently fitted therewith reversely disposed substantially U-shaped guide members 7 and 8, respectively, for the extensible sliding connection of said bars with each other.

The bar 6 at its outer end is provided with a turning stud 9 forming a pintle end for engagement in a bearing 10, which has lateral ears 11, these accommodating fasteners 12 for the fastening of the bearing upon the wall mirror A, preferably at the top thereof and at an intermediate point. Thus it will be seen that the extensible arm can swing horizontally in its entirety.

The other bar 5 at its forward end has adjustably connected therewith a vertically swinging arm 13 which is straight and flat. This arm 13 at its end next to the bar 5 is engaged upon a nut carrying bolt 14 forming a pivotal connection therebetween. Between these pivotally connected ends are outside metal washers 15 and confronting inside fibre disks 16, respectively, which are carried by the bolt 14 and effect a friction joint between the extensible arm and the vertically swinging arm constituting the bracket for the rear view mirror. The outside washers are preferably brazed or welded to the ends adjacent thereto of the bar 5 and the arm 13.

Carried at the outer end of the arm 13 is an inverted substantially U-shaped clip 17 fitted with a horizontal pivot 18 swingingly connecting it to the said outer end of the arm 13. This clip 17 has a central stud 19 forming a pivot for an upstanding holder 20 for the rear view mirror glass 21, which may be made secure thereto in any suitable manner.

This holder has contacting therewith at its pivot point the inside fibre washers 22, while against these are the outside metal washers 23. The washers 22 and 23 are fitted with the stud 19 as is clearly shown in Figure 2 of the drawing. This arrangement makes a friction joint and the entire assembly at the outer end of the arm 13 functions as a universal joint allowing the mirror glass to turn horizontally and the latter and the arm, respectively to swing vertically.

In Figure 4 of the drawing the bearing 24 which is alike to the bearing 10 carries a clamp 25 having a set screw 26, so that the bracket for the rear view mirror can be detachably mounted in place.

It will be obvious that the rear view mirror has the advantage in use of manipulation without operating screws or clamps. The friction joints of the bracket taking care of adjustment of the mirror glass 21 as the latter will be held in varying adjusted positions.

What is claimed is:

The combination of a plurality of straight narrow bars, loops fixed to a pair of said bars to slidably connect one with the other and frictionally embracing the same, the bars of the pair being superposed with relation to each other and edge-to-edge, a pivot connecting one of the bars of the pair with a remaining bar for swinging movement of the latter, a pair of friction disks between the pivoted portions of the bars and engaging the pivot, a plate-like mirror holder having a rearwardly extending ear, an inverted substantially U-shaped member pivoted to the free end of said remaining bar, a stud connecting the ear with the member and having friction disks acting on the ear, and means swingingly supporting the other bar of the pair for movement about an axis at right angles to the axis of the pivotal connection of said one bar with said remaining bar.

MURIEL C. EDDY.